March 26, 1963     G. R. WHITNEY     3,082,790
FLUSH VALVE CONTROL APPARATUS

Filed June 29, 1961     3 Sheets-Sheet 1

INVENTOR.
Glenn R. Whitney.
BY
Attorney.

March 26, 1963  G. R. WHITNEY  3,082,790
FLUSH VALVE CONTROL APPARATUS
Filed June 29, 1961  3 Sheets-Sheet 2
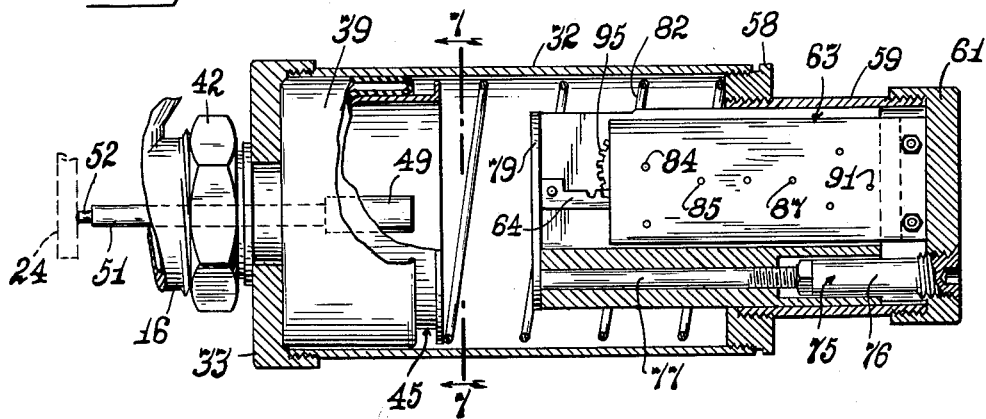
Fig. 3.
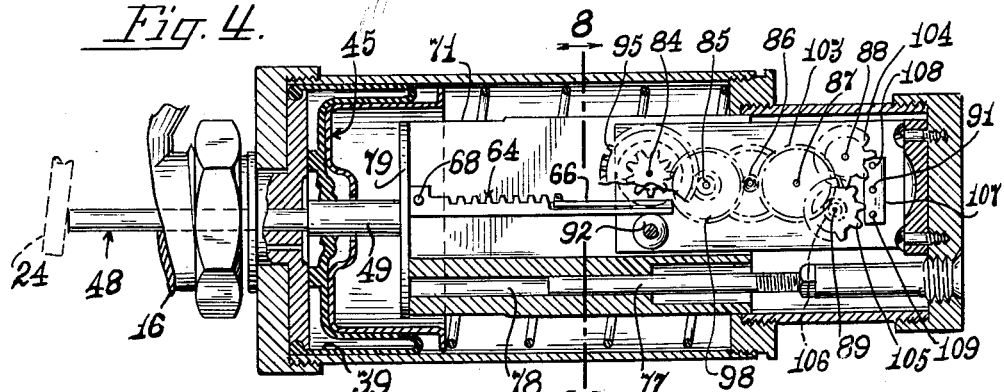
Fig. 4.
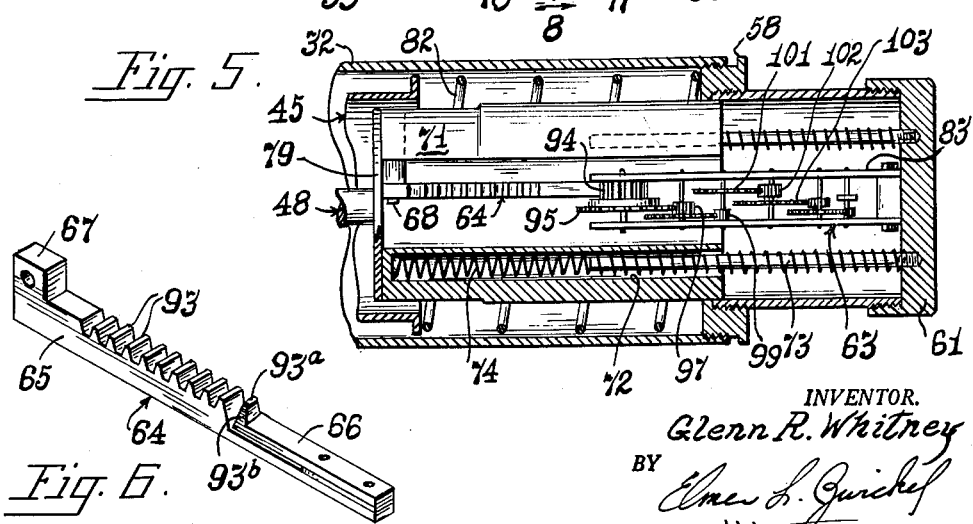
Fig. 5.
Fig. 6.
INVENTOR.
Glenn R. Whitney
BY
Elmer L. Quickel
Attorney.

March 26, 1963　　　G. R. WHITNEY　　　3,082,790
FLUSH VALVE CONTROL APPARATUS
Filed June 29, 1961　　　　　　　　　　　　　　3 Sheets-Sheet 3
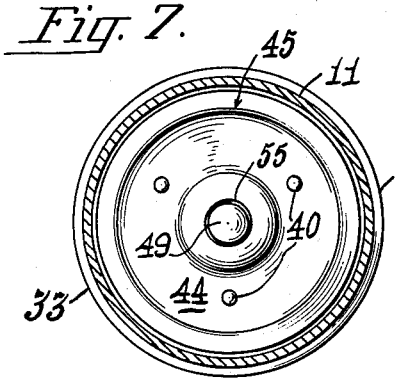
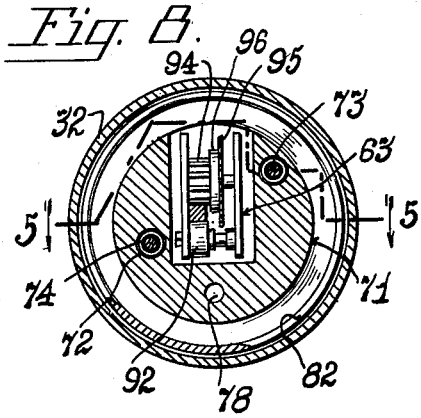
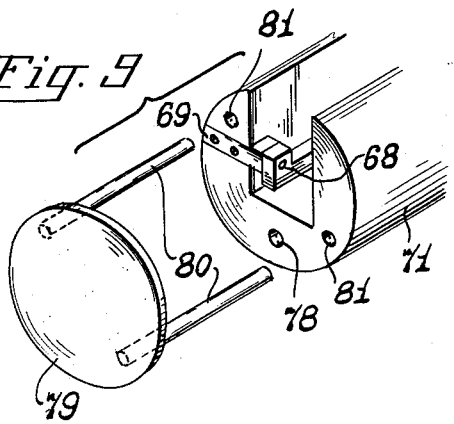
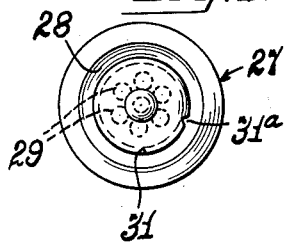
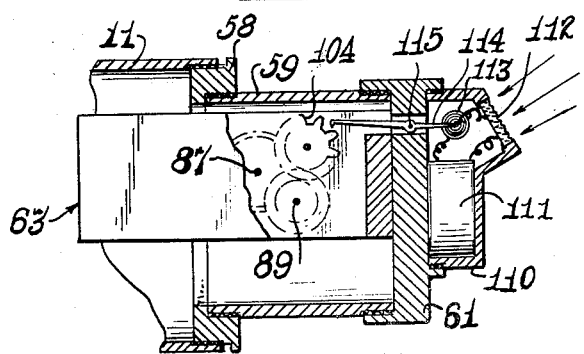
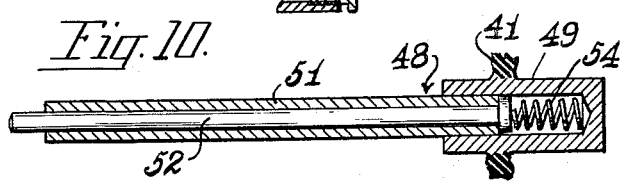
INVENTOR.
Glenn R. Whitney
BY
Elmer L. Zwickel
Attorney.

3,082,790
Patented Mar. 26, 1963

3,082,790
FLUSH VALVE CONTROL APPARATUS
Glenn R. Whitney, 3335 Diversey Ave., Chicago, Ill.
Filed June 29, 1961, Ser. No. 120,748
16 Claims. (Cl. 137—624.14)

This application is a continuation-in-part of co-pending application Serial No. 778,862, filed December 8, 1958, now Patent No. 3,045,698, granted July 24, 1962.

The invention relates to improvements in the construction and assembly of a device for automatically actuating or operating a valve or other apparatus at predetermined intervals. The device of the present invention is particularly adapted for operating flush valves of the type commonly used in urinals.

More particularly, the present device includes a normally spring tensioned hammer which, when released, by its impact opens the valve or otherwise actuates an apparatus to be operated. It also includes a novel flexible expansion element preferably in the form of a cup-shaped diaphragm by means of which the hammer is carried into a pre-set or loaded position wherein the springs are compressed through action of water pressure on the discharge side of the valve to be actuated. Timing means, such as an escapement mechanism, also is provided for predetermined time interval triggering and release of the spring loaded hammer. The assembly also includes novel means to regulate and maintain substantially uniform pressure on the water line leading to the valve to be actuated and novel means in the flow discharge side of the valve to restrain flow of discharge water until requisit predetermined pressure is built up for returning the hammer to spring loaded position.

The herein disclosed assembly also may include novel electronically actuated means for locking the valve actuating device under conditions when normal operation is not required or desirable such as at night time or during other periods when the service is not required.

It is therefore an object of the invention to provide a valve actuating device embodying the novel features and advantages hereinabove referred to.

Another object is to provide a device of the character referred to with a novel roll-back pressure responsive cup-like diaphragm.

Another object is to provide a valve actuating device with novelly constructed escapement mechanism for operational time control and novel means to vary the operating cycle.

Another object is to provide novel pressure control means in association with the actuating device to insure proper periodic operation thereof irrespective of line pressure.

Another object is to provide novel means to render the actuating device inoperable.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

FIG. 3 is an enlarged longitudinal sectional view of the actuating device, viewed at a 90° angle to the FIG. 2 disclosure, illustrating the operational position of the parts, some of which are shown in elevation.

FIG. 4 is a sectional view of the actuating device, similar to FIG. 3 but showing the parts in released or actuating position.

FIG. 5 is a sectional view taken substantially on line 5—5 of FIG. 7, showing the parts in the valve actuating position illustrated in FIG. 4.

FIG. 6 is a detail perspective view of the rack.

FIG. 7 is a cross sectional view taken substantially on line 7—7 of FIG. 2.

FIG. 8 is a cross sectional view taken substantially on line 8—8 of FIG. 4.

FIG. 9 is a fragmentary perspective view of the hammer showing the end plate separated therefrom.

FIG. 10 is an enlarged longitudinal sectional view of the hammer stem.

FIG. 11 is a fragmentary sectional view similar to FIG. 4, showing light sensitive lock means associated with the escapement mechanism.

FIG. 12 is a bottom plan view of the pressure control element.

Figure 1:
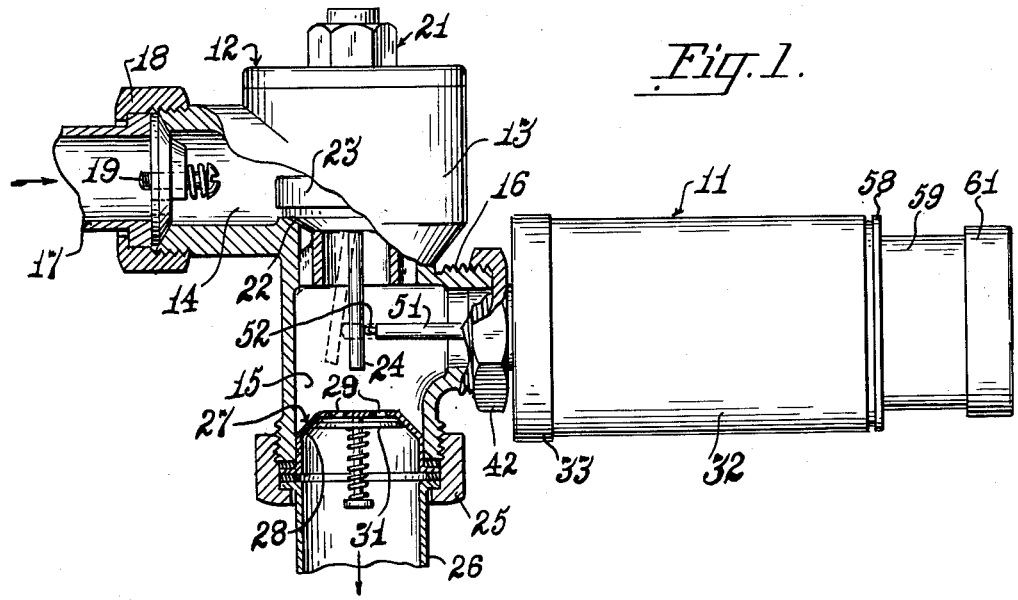
FIG. 1 is a side elevational view of the actuating device, showing it mounted on a conventional flush valve, parts of which are broken away.

Referring to the exemplary installation of the actuating device shown in FIG. 1, said device, generally indicated at 11, is mounted on a conventional type of flush valve generally indicated at 12. This flush valve includes a vertically extending housing 13 having a transverse inlet 14 and a depending vertical outlet 15. The vertical outlet 15 is formed with a transverse opening defined by an externally threaded flange 16. A line conduit 17 is connected to inlet 14 is by means of a coupling nut 18 which has a flow regulator 19 seated therein and which is adjustable so as to regulate the volume of water delivered to the interior of housing 13. A pressure regulator 21 of conventional construction also is mounted on valve housing 13. The mechanism of valve 12 is of conventional construction (such as those commercially known as "Royal" and "Naval" flush valves, manufactured by Sloan Valve Co.), including a seat 22 and a valve element 23, the latter having an operating stem 24 depending therefrom and extending into the outlet 15. This stem 24 is adapted to be actuated, in a manner to be described presently, so as to periodically move valve element 23 into an open position whereupon water is permitted to flow under regulated line pressure from housing 13 into outlet 15 which is connected, as by union 25 to discharge line 26.

For purposes to be explained presently, a novel flow regulator 27 is installed in line 26. As shown, this regulator is comprised of an externally flanged inverted cup shaped body 28 that is locked in place between the end of outlet 15 and the discharge line 26. The closed end of said body is of reduced diameter and its end wall is perforated, as at 29, which perforations normally are closed by a spring pressed disc 31, the periphery of which rests against the tapered wall of said body and which is adjusted to resist discharge water pressure of about 2 lbs. before moving into an open position. This pressure buildup in outlet 15 is desirable to insure operation of the novel valve actuating device 11 now to be described. It should be noted however that said disc 31 has a notch 31a (FIG. 12) on its peripheral edge to permit any water remaining in outlet 15 when valve 12 is closed to drain out. The location of notch 31a renders it self cleaning.

Figure 2:
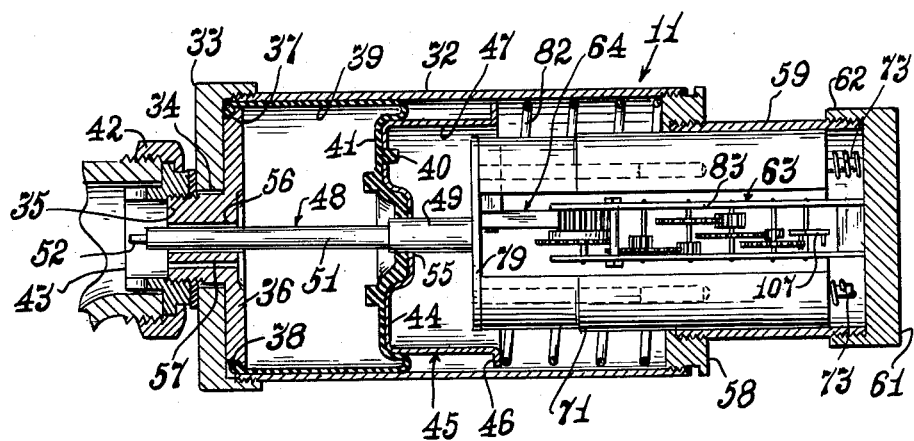
FIG. 2 is an enlarged longitudinal sectional view of the actuating device showing its parts in positions assumed while spring loading the hammer, and illustrating parts in elevation.

The actuating device 11 includes an elongated tubular casing 32 having a cap 33 externally threaded on one end thereof. Cap 33 is apertured axially, as at 34, to receive loosely therethrough the externally threaded axial hub 35 of a diaphragm anchor plate 36. As shown in FIGS. 2 and 4, the peripheral edge of said plate is suitably recessed circumferentially as at 37, to receive seated therein the free circumferentially beaded edge 38 of a highly flexible tough cup-shaped diaphragm 39 including a bottom wall 41. A coupling nut 42 is secured for free rotation on outwardly projecting end of said hub 35 by a lock ring 43 (FIG. 2) that serves to secure the anchor plate and diaphragm in place in end cap 33.

The bottom wall of diaphragm 39 is attached in any suitable manner, as by teats 40, to the end wall 44 of a cup shaped follower 45 that has a free sliding fit within cylindrical casing 32. The follower 45 has an external peripheral flange 46 on the free edge of its cylindrical wall 47 that rides freely along the inside surface of casing 32 and its cylindrical wall 47 is of a diameter sufficiently small to permit the diaphragm wall to collapse, in a manner to be described presently, into a substantially folded condition between said wall and the shell. The bottom wall 41 of diaphragm 39 carries a hammer rod assembly 48. As best shown in FIG. 10, the rod 48 is comprised of a hollow head 49 to which the diaphragm wall 41 is secured and into which one end of a tubular stem 51 is press fitted. A plunger 52 extends through said stem and it has a head 53 enclosed within the head 49. A spring 54 enclosed within the head 49 normally urges the plunger into a position with its free end extending beyond the end of stem 51.

The rod assembly 48 is mounted in the diaphragm in such manner that a portion of its head 49 extends freely through an axial opening 55 in said cup-shaped follower 45 and the stem thereof projects outwardly loosely through an axial opening 56 in hub 35. When the device is mounted on the valve body 11, as best shown in FIG. 1, the stem 51 is disposed in registering alignment and in abutment with valve operating stem 24 and, during operation of the actuating device, is adapted to periodically strike said stem 24 for displacing valve element 23. A flow passage 57 is provided in hub 35 for a purpose to be explained presently.

The other end of the tubular casing 32 is closed by an externally threaded ring 58 threaded thereinto and which is internally threaded to receive the threaded end of a sleeve 59 having a diameter considerably less than the diameter of casing 32. A cap 61 having an internally threaded flange 62 is threaded onto the other or free end of said sleeve 59 to close same.

Cap 61 mounts, on its inside face, an escapement mechanism generally indicated at 63 and which will be described in detail presently. A rack 64 is operatively associated with said escape mechanism and, as best shown in FIG. 6, this rack comprises a toothed bar 65 having a resiliently yieldable tooth carrying element 66 secured at one end thereof and a journal portion 67 at its other end. As is perhaps best shown in FIGS. 4 and 9 the journal portion 67 of rack 64 is pivotally mounted on a stud 68 extending from one end of a mounting bar 69 firmly secured in a recess in one end of a hammer 71. Hammer 71 is comprised of a heavy cylindrical body adapted to have a free sliding fit in sleeve 59 and has a hollow interior coextensive with its length and opening onto the side wall thereof so as to receive extended thereinto the escapement mechanism 63. The hammer 71 has a pair of diametrically opposed holes 72 (FIGS. 5 and 8) terminating short of the end carrying rack 64 and into which a pair of guide rods 73 secured to end cap 61 extend. Springs 74 are fitted one over each rod 73 and extend into the holes 72 so as to normally urge the hammer in a direction away from cap 61 and toward stem or rod 48.

Since it is desired to limit the extent to which the hammer may be moved toward the cap 61, for purposes to be explained presently, an adjusting limit device 75 (FIGS. 3 and 4) is provided. This device includes a sleeve 76 screw threaded in cap 61 and having a stop pin 77 screw threaded endwise thereinto for longitudinal adjustment of its effective length. The stop pin 77 slides freely through a hole 78 in hammer 71.

The end of the hammer carrying the rack 64 is closed normally by a striker plate 79 of a diameter responding to the diameter of said hammer and which is considerably less than the inside diameter of diaphragm follower 45. A pair of guide pins 80 carried firmly in said plate project at all times into guide openings 81 in the hammer as best shown in FIG. 9. It should be evident that movement of striker plate 79 in the direction of cap 61 is limited by the positioning of the end of stop pin 77, thus the extent of such movement can be incrementally controlled by adjustment of said stop pin in its sleeve mounting 76, even though the hammer is spring loaded.

Operation of the actuating device insofar as it has been described hereinabove is substantially as follows:

The actuating device is connected by coupling nut 42 onto the externally threaded flange 16 of valve housing 13 so as to locate the projecting end of plunger 52 of rod 48 in alignment with valve stem 24 and is thus positioned to operate said valve when the device is actuated. Because there is no water pressure within valve outlet 15 at the time of installation, the springs 74 will have moved hammer 71 to the left, as viewed in the drawings, to thereby cause striker plate 79 to bear against the end of the hammer rod 48, thus urging said rod outwardly and into abutment with valve stem 24. This opens said valve 21 and admits water into housing outlet 15. Water entering housing outlet 15 is restrained from flowing out through discharge line 26 until a pressure of approximately two pounds is built up within housing outlet 15 whereupon the resistance of flow regulator 27 is overcome and water will then be discharged through line 26 so long as valve element remains open. However, during pressure accumulation in housing outlet 15, water flows through passageway 57 (FIG. 2) into the interior of the cup-shaped diaphragm 39, thus expanding same and urging its bottom wall 41 to the right, as viewed in the drawings, from the position shown in FIG. 3 into substantially the position shown in FIG. 2. Initial expansion of the diaphragm carries the hammer stem 51 out of contact with valve stem 24 but spring pressure on plunger 52 retains said plunger projected into engagement with the valve stem to retain it in its tilted position and hold the valve open during initial withdrawal of the hammer stem 51 and for a period of time required to permit full valve opening and compression loading of the hammer, as described hereinafter. In the absence of such plunger, the valve would close immediately following initial withdrawal movement of the hammer stem with the result that there would be insufficient water flow into the diaphragm to carry the hammer into rack engaging position. Continued movement of said stem carries its end 49 into contact with striker plate 79 thus carrying said plate and the hammer 71 to the right (FIG. 2) a distance determined by the setting of stop limit device 75 (FIG. 4), and compressing springs 74. The rack 64 carried by hammer 71 is now engaged with the escapement mechanism 63 which restrains the spring loaded hammer from returning at once to its initial position, while a spring 82 interposed between the diaphragm follower 45 and ring 58 restores said follower cup and diaphragm to their initial FIG. 3 position with the end of plunger 52 in abutment with valve stem 24. However, this contact is insufficient to actuate the valve because no actuating impact is applied to the rod assembly 48 and said valve will remain closed until said assembly is struck an impact blow by hammer 71 which remains in its retracted (FIG. 3) position until released from the escapement mechanism 63 now to be described.

The escapement mechanism 63, best illustrated in FIGS.

4, 5 and 8, includes two spaced apart parallel plates 83 that are rigidly mounted on cap 61 and extend into hollow interior of hammer 71. It carries seven shafts 84, 85, 86, 87, 88, 89 and 91 which extend between plates 83 with their ends journalled therein. These shafts mount gear wheels and other parts described below to form an escapement mechanism cooperating with rack bar 64.

The rack bar 64 is guided by a roller 92 rotatably supported between plates 83 below said bar. The rack bar gear teeth 93 are disposed to engage a pinion 94 fixedly mounted on shaft 84, which shaft also carries therein gear wheel 95 freely rotatable thereon but having a one-way friction clutch 96 associated therewith for operatively connecting said gear wheel 95 with pinion 94. This clutch arrangement permits the rack bar to be thrust into engagement with pinion 94 when hammer 71 is moved to the right without rotating gear wheel 95, but restrains free wheeling of said hammer in the opposite direction thus affording a positive drive connection between rack bar 64 and the escapement mechanism.

The shafts 85, 86 and 87 have fixedly mounted thereon, a pinion 97 engaging gear wheel 95 and a gear 98 (shaft 85); a pinion 99 engaging the gear 98 and a gear 101 (shaft 86); and a pinion 102 engaging gear 101 and a gear wheel 103 (shaft 87). The shafts 88 and 89 mount meshing star wheels 104 and 105 respectively and shaft 89 also carries a pinion 106 that is meshed with gear wheel 103. Shaft 91 carries firmly a rectangular plate 107 having diametrically opposed transversely projecting pins 108 and 109 (FIG. 4) which are adapted to engage respectively, the star wheels 104 and 105.

It will be understood from the foregoing that when striker plate 79 and hammer 71 are pushed to the right in response to fluid pressure on diaphragm 39, the springs 74 are compressed and tend to push the hammer and plate to the left. However, movement of said hammer and plate to the left is permitted to take place only slowly, since rack bar 64 engages pinion 94 which then moves as a unit with gear wheel 95. The ratios of the gear train described hereinabove are such that the rate of rotation of pinion 94 is considerably less than rotation of star wheels 104 and 105. As the spring loaded hammer is urged to the left from the position shown in FIG. 3, the gear train is activated rocking plate 107 to cause pins 108 and 109 to alternately engage, respectively, said star wheels 104 and 105 to permit slow intermittent rotation of pinion 106. Such intermittent rotation of pinion 106 is transmitted through the above noted gear train to pinion 94 and the rack bar is gradually permitted to move to the left under the influence of springs 74. When the last tooth 93a (FIG. 6) of the rack has moved out of engagement with said pinion 94 it is suddenly released and the springs 74 thrust the hammer 71 and striker plate 79 violently to the left causing the latter to strike an impact blow on the end of rod assembly 48 as best illustrated in FIG. 4. Owing to the loose mounting of said assembly 48 in follower 45 and the flexibility of the diaphragm end wall 41 in the circular area surrounding said assembly, said assembly is pushed to the left sufficiently to displace the operating stem 24 of the valve element to open said valve whereby water is caused to flow into housing 15 and through outlet 25. This water is, as stated hereinabove, initially restrained by flow regulator 27 and some of the water flows through passage 57 to reactivate diaphragm 39 and carry hammer 71 into its retracted spring loaded position thus resetting the device for another operating cycle.

In order to facilitate smooth engagement of the rack bar teeth 91 with pinion 92 when the hammer is moved to the right, or retracted spring loaded position, the first tooth 93a of said rack bar is partially cut away as at 93b (FIG. 6) and it is carried on the resilient strip 60 forming a part of the rack bar. This assembly reduces surface friction between the tooth 93a and the engaged tooth of pinion 94 and permits the tooth 93a to yield sufficiently to by-pass the related tooth on pinion 92 should it be in such position as to normally interfere with tooth engagement.

To sum up the operational characteristics of the actuating device, initial flow of water into housing 15 carries the diaphragm inwardly, or to the right, thus carrying the stem plunger assembly 48 away from the valve operating stem 24, thus closing the valve and stopping the flow of water. Inward movement of the diaphragm moves the striker plate 79 and hammer 71 to the right a distance determined by the setting of stop rod 77. The springs 74 are now compressed so as to urge the hammer and plate in a return direction (to the left) but at a slow rate over a first portion of its return path because of the escapement mechanism. Following spring loading of the hammer, the spring 82 will return the diaphragm to its initial collapsed condition, any water therein bleeding through passage 57 and valve plate notch 31a. As soon as the rack is released from said mechanism, the hammer and plate are accorded a rapid movement over the last portion of their return path so as to strike a sharp blow against the head 49 of plunger assembly 48 to actuate the valve. Then, as mentioned hereinabove, water entering the diaphragm (which has collapsed and emptied of water) will again expand said diaphragm and reset the hammer for another operating cycle. The time lapse between resetting of the hammer and the subsequent hammer impact is determined as aforementioned by the setting of stop rod 77 and the gear ratios of the escapement mechanism. With the disclosed structure the setting may be for intervals of about 20 minutes or less, as desired.

There are instances of installation of the hereindisclosed actuating mechanism when it is desirable or necessary to render same inoperative for selected periods of time, as for example when used in an installation that is in service only during certain hours of the day. Such control may be responsive to illumination, artificial or sunlight, in the area of the installation. As shown in FIG. 11, the actuating mechanism, which is otherwise identical to that described hereinabove, is provided with a light sensitive control device operable in the absence of illumination in the surrounding area to actuate brake means for restraining the operation of escapement mechanism. More specifically, the cap 61a shown in FIG. 11, has mounted on its outside face a suitable housing 110, which contains a long life battery 111 and a light sensitive element 112, including an electrically responsive element 113 having a lever 114 pivoted at 115. The free end of said lever is disposed to be moved into and out of frictional engagement with star wheel 104. Its operation is such that when illumination is present, an electrical circuit is completed between battery 111, light sensitive element 112, and lever actuating element 113 so as to hold said lever out of engagement with wheel 104. However, when there is insufficient illumination the circuit is broken and the lever swings into wheel engagement thus breaking same.

As many possible embodiments may be made in the invention, and as many changes might be made in the embodiments above set forth, it is to be understood that all matters hereinbefore set forth or shown in the accompanying drawings are to be interpreted as illustrative and not in a limiting sense.

Having thus described the invention, what is claimed as new and desired to be secured by Letters Patent of the United States is:

1. A drive for actuating a valve or the like comprising an elongated casing closed at both of its ends and having an axial opening in one of said ends, a flexible expansion element within said casing and encompassing said opening, a non-deformable member inwardly of said expansion element and movable with said element, spring means acting on said member to retain the expansion element in a collapsed condition normally, a tubular hammer within and guide by said casing for axial movement therein, a plunger assembly connected between its ends to said expansible element and having one of its ends extending outwardly through said opening and its other end projecting through the non-deformable member and into said casing, second spring means within said casing urging said hammer in an axial direction toward said inwardly projecting end of said plunger assembly, an escapement mechanism supported within the closed end of said casing in fixed position and projecting into the hammer, said escapement including a train of gears, a rack bar extending within the hammer and normally engaged with said gearing, said rack bar having one end secured to said hammer so as to be tensioned by the spring tensioning of the hammer to actuate said gear train, the gearing on said rack bar being of such length as to be released from engagement with the gear train before expansion of said second spring means has been completed, said hammer then being free to move towards the opposed end of said plunger assembly over a substantial distance to impact forcibly against said rod to suddenly and forcibly displace said assembly outwardly through the casing opening for valve operating purposes, said hammer being capable of being reset for repeated valve operation by admission of fluid under discharge pressure through said casing opening into the expansible element.

2. A drive for actuating a valve or the like comprising an elongated casing having an axial opening in one of said ends, a flexible expansion element within said casing and encompassing said opening, spring means acting on said expansion element to retain said expansion element in a collapsed condition normally, a tubular hammer within said casing for axial movement therein, a rod connected between its ends to said expansible element and having one of its ends extending outwardly through said opening and its other end projecting into said casing and terminating short of the hammer, second spring means within said casing urging said hammer in an axial direction toward said inwardly projecting end of said rod, an escapement mechanism supported within said casing in fixed position and projecting into the hammer, said escapement including a train of gears, and a rack bar extending within the hammer and normally engaged with said gearing, said rack bar having one end secured to said hammer so as to be tensioned by the spring tensioning of the hammer to actuate said gear train, the gearing on said rack bar being of such length as to be released from engagement with the gear train before expansion of said second spring means has been completed, said hammer then being free to move towards the opposed end of said rod over a usbstantial distance to impact forcibly against said rod to suddenly and forcibly displace said rod outwardly through the casing opening for valve operating purposes, said hammer being capable of being reset for repeated valve operation by admission of fluid under discharge pressure through said casing opening into the expansible element.

3. A drive for actuating a valve or the like comprising an elongated casing having an axial opening in one of said ends, a flexible expansion element within said casing and encompassing said opening, spring means acting on said element to retain it in a collapsed condition normally, a hammer within and guided by said casing for axial movement therein, a rod connected between its ends to said expansible element and having one of its ends extending outwardly through said opening and its other end projecting into said casing, and terminating short of one end of said hammer, second spring means within said casing urging said hammer in an axial direction toward said inwardly projecting end of said rod, an escapement mechanism supported within said casing in fixed position rearwardly of the other end of the hammer, said escapement including a train of gears, and a rack bar connected to the hammer and normally engaged with said gearing, so as to be tensioned by the spring tensioning of the hammer to actuate said gear train, the gearing on said rack bar being of such length as to be released from engagement with the gear train before expansion of said second spring means has been completed, said hammer then being free to move towards the opposed end of said rod over a substantial distance to impact forcibly against said rod to suddenly and forcibly displace said rod outwardly through the casing opening for valve operating purposes, said hammer being capable of being reset for repeated valve operation by admission of fluid under discharge pressure through said casing opening into the expansible element.

4. A drive for actuating a valve or the like comprising an elongated casing having an axial opening in one of said ends, a flexible expansion element within said casing and encompassing said opening, means to retain the expansion element in a collapsed condition normally, a hammer within and guided by said casing for axial movement therein, a rod connected between its ends to said expansible element and having one of its ends extending outwardly through said opening and its other end projecting into said casing, resiliently compressible means within said casing urging said hammer in an axial direction toward said inwardly projecting end of said rod, an escapement mechanism supported within said casing in fixed position, said escapement including a train of gears, and a rack bar carried by the hammer and normally engaged with said gearing, said rack bar being tensioned by resiliently compressible means to actuate said gear train, the gearing on said rack bar being of such length as to be released from engagement with the gear train before maximum movement of the hammer has been completed to release the hammer for free movement towards the opposed end of said rod over a substantial distance to impact forcibly against said rod to suddenly and forcibly displace said rod outwarly through the casing opening for valve operating purposes, said hammer being capable of being reset for repeated valve operation by admission of fluid under discharge pressure through said casing opening into the expansible element.

5. A device for operating a valve or the like comprising an elongater casing apertured at one end, means mounting said casing on a valve body with the aperture in flow communication with the outlet side of the valve body, an expansible substantially cup-shaped element within the casing and having its interior in communication with said aperture, spring means normally retaining said cup-shaped element in a substantially collapsed condition, said cup-shaped element being adapted to be expanded when fluid flowing through said valve enters the aperture, a hammer within said casing displaceable by expansion of said element, second spring means operative to displace said hammer and compressible by expansion of said element, and means for controlling the expansion of said second spring means after compression thereof.

6. The device recited in claim 5 in which flow restraining means is provided in the valve outlet.

7. The device recited in claim 5 in which the regulating means comprises an escapement mechanism.

8. The device recited in claim 5 in which the regulating means comprises a rack on the hammer and an escapement gear train operably associated with said rack.

9. The device recited in claim 5 in which means is provided to adjust the length of the displacement of said hammer.

10. A device for operating a valve or the like comprising an elongated casing apertured at one end to receive fluid discharged when said valve element is in open position, an expansible element within said casing adapted to be expanded by fluid entering said aperture, means carried by said expansible element for displacing the valve, a first spring compressible by said expansible element adapted to urge it into a collapsed condition, second spring means compressible by the expansion of said expansible element, means actuable by said second spring means when compressed to strike said valve displacing means for displacing the valve, and an escapement for regulating the rate of actuation of said second spring means.

11. The device recited in claim 10 in which the means actuable by said second spring means comprises a hammer.

12. The device recited in claim 10 in which the expansible element comprises a cup-shaped diaphragm.

13. The device recited in claim 10 in which the means for displacing the valve includes means to delay closing of said valve prior to compression of said second spring means.

14. The device recited in claim 10 in which means is provided to render the device inoperable.

15. The device recited in claim 10 in which means responsive to the absence of light is provided to render the device inoperable.

16. A drive for actuating a valve or the like comprising an elongated casing having an opening in one of said ends, a flexible expansion element within said casing and encompassing said opening, spring means acting on said member to retain the expansion element in a collapsed condition normally, a hammer within said casing for axial movement therein a rod connected between its ends to said expansible element and having one of its ends extending outwardly through said opening and its other end projecting into said casing, second spring means within said casing urging said hammer in an axial direction toward said inwardly projecting end of said rod, an escapement mechanism supported within the other end of said casing in fixed position, said escapement including a train of gears, and a rack bar connected to the hammer and normally engaged with said gearing, said rack bar being tensioned by the spring tensioning of the hammer to actuate said gear train, the gearing on said rack bar being of such length as to be released from engagement with the gear train before expansion of said second spring means has been completed, said hammer then being free to move towards the opposed end of said rod over a substantial distance to impact forcibly against said rod to suddenly and forcibly displace said rod outwardly through the casing opening for valve operating purposes, said hammer being capable of being reset for repeated valve operation by admission of fluid under pressure into the expansible element, and means responsive to the absence of illumination in the area of the installation of said device to lock said escapement mechanism.

References Cited in the file of this patent

UNITED STATES PATENTS

| | | |
|---|---|---|
| 1,878,001 | Sloan | Sept. 20, 1932 |
| 2,849,580 | Becker | July 14, 1959 |